(12) United States Patent
Miyake et al.

(10) Patent No.: US 11,712,950 B2
(45) Date of Patent: Aug. 1, 2023

(54) VEHICLE DOOR

(71) Applicant: HONDA MOTOR CO., LTD., Tokyo (JP)

(72) Inventors: Yoshinori Miyake, Wako (JP); Keisuke Hayashi, Wako (JP); Toshihiro Yamaguchi, Wako (JP); Suguru Matsunaga, Wako (JP); Fumiyoshi Mizutani, Wako (JP); Atsushi Maruyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 330 days.

(21) Appl. No.: 17/168,419

(22) Filed: Feb. 5, 2021

(65) Prior Publication Data

US 2021/0245588 A1 Aug. 12, 2021

(30) Foreign Application Priority Data

Feb. 7, 2020 (JP) .................................. 2020-019529

(51) Int. Cl.
*B60J 5/10* (2006.01)
*E05B 79/04* (2014.01)
*E05B 83/18* (2014.01)

(52) U.S. Cl.
CPC ............ *B60J 5/107* (2013.01); *B60Y 2200/11* (2013.01); *E05B 79/04* (2013.01); *E05B 83/18* (2013.01)

(58) Field of Classification Search
CPC . B60J 5/042; B60J 5/045; B60J 5/0451; B60J 5/0455; B60J 5/107; B60J 5/10; B60J 5/101
(Continued)

(56) References Cited

U.S. PATENT DOCUMENTS

| 5,906,073 A | * | 5/1999 | Hori | ......................... | B60J 5/107 |
| | | | | | 49/394 |
| 2013/0001982 A1 | * | 1/2013 | Ohba | ....................... | B60J 5/101 |
| | | | | | 296/187.11 |

(Continued)

FOREIGN PATENT DOCUMENTS

| JP | H05-16431 U | 3/1993 |
| JP | 2000-118445 A | 4/2000 |

(Continued)

OTHER PUBLICATIONS

Fujiwara et al. "Rear part vehicle body structure", JP 2015-39991 A, machine translation, ip.com, Mar. 2, 2015 (Year: 2015).*

(Continued)

*Primary Examiner* — Jason S Morrow
*Assistant Examiner* — Wenwei Zhuo
(74) *Attorney, Agent, or Firm* — Rankin, Hill & Clark LLP

(57) ABSTRACT

A vehicle door attached to a vehicle body includes a bracket structure disposed between an interior-side panel and an exterior-side panel to support a door lock portion. The bracket structure has an interior-side extension portion disposed on an interior-side and joined to the interior-side panel, and an exterior-side extension portion disposed on an exterior-side and joined to the exterior-side panel. Extension portions extend in an upper-lower direction. As an alternative, a vehicle door includes a middle panel disposed between an inner panel and an outer panel, and a bracket structure disposed between the inner panel and the middle panel to support the door lock portion. The bracket structure has a front extension portion disposed frontward and joined to the inner panel, and a rear extension portion disposed rearward and joined to the middle panel. Extension portions (Continued)

are disposed in a front-rear direction of a vehicle and extend upward.

6 Claims, 7 Drawing Sheets

(58) Field of Classification Search
USPC .................. 296/146.8, 146.5, 146.6, 56
See application file for complete search history.

(56) References Cited

U.S. PATENT DOCUMENTS

| 2015/0000956 A1 | 1/2015 | Spinella | |
| 2017/0036521 A1* | 2/2017 | Ogawa | B60J 5/0431 |
| 2017/0174058 A1* | 6/2017 | Miyake | B60J 5/101 |

FOREIGN PATENT DOCUMENTS

| JP | 2000118445 A | * | 4/2000 |
| JP | 2015-039991 A | | 3/2015 |
| JP | 2015039991 A | * | 3/2015 |
| JP | 2016-523718 A | | 8/2016 |
| JP | 2017-109585 A | | 6/2017 |
| JP | 2018-165113 A | | 10/2018 |

OTHER PUBLICATIONS

Office Action received in corresponding Japanese application No. 2020-019529 dated Nov. 9, 2021 with English translation (10 pages).

* cited by examiner

VEHICLE DOOR

CROSS-REFERENCE TO RELATED APPLICATION

This application claims the benefit of foreign priority to Japanese Patent Application No. 2020-019529, filed on Feb. 7, 2020, which is incorporated by reference in its entirety.

TECHNICAL FIELD

The present invention relates to a vehicle door used for a vehicle such as an automobile.

BACKGROUND

A lock fixing portion for fixing a door lock member is disclosed, for example, by JP 2018-165113 A. The lock fixing portion has an extension portion extending upward along an inner panel.

JP 2018-165113 A discloses a structure in which the lock fixing portion, a side reinforcement member and an inner panel are integrally fastened to a fixing portion using bolts.

In the above-described door structure, the lock fixing portion directly transmits vibration to a door lock member when a tailgate is closed, and the door lock member vibrates and interferes with a fixing portion fastening part of the vehicle body. This may cause vibration and unusual noise to be transmitted to an occupant seated in the passenger compartment, resulting in a feeling of discomfort.

In view of the above, an object of the present invention is to provide a vehicle door capable of suppressing vibration and unusual noise generated when the vehicle door is closed.

SUMMARY

In one aspect of the present invention, there is provided a vehicle door openably and closeably attached to a vehicle body, the vehicle door comprising: an interior-side panel and an exterior-side panel; a door lock portion to be locked to the vehicle body; and a bracket structure disposed between the interior-side panel and the exterior-side panel and configured to support the door lock portion, wherein the bracket structure has extension portions extending in an upper-lower direction respectively on an interior-side and an exterior-side of the bracket structure, and wherein the extension portions are an interior-side extension portion disposed on the interior-side and joined to the interior-side panel, and an exterior-side extension portion disposed on the exterior-side and joined to the exterior-side panel.

In another aspect of the present invention, there is provided a vehicle door openably and closeably attached to a rear portion of a vehicle body, the vehicle door comprising: an inner panel; an outer panel; a middle panel disposed between the inner panel and the outer panel; a door lock portion to be locked to the rear portion of the vehicle body; and a bracket structure disposed between the inner panel and the middle panel and configured to support the door lock portion, wherein the bracket structure has extension portions respectively disposed in a front-rear direction of a vehicle and extending upward, and wherein the extension portions are a front extension portion disposed frontward and joined to the inner panel, and a rear extension portion disposed rearward and joined to the middle panel.

BRIEF DESCRIPTION OF THE DRAWINGS

The drawings described herein are for illustration purposes only and are not intended to limit the scope of the present invention in any way.

DETAILED DESCRIPTION

Figure 1:
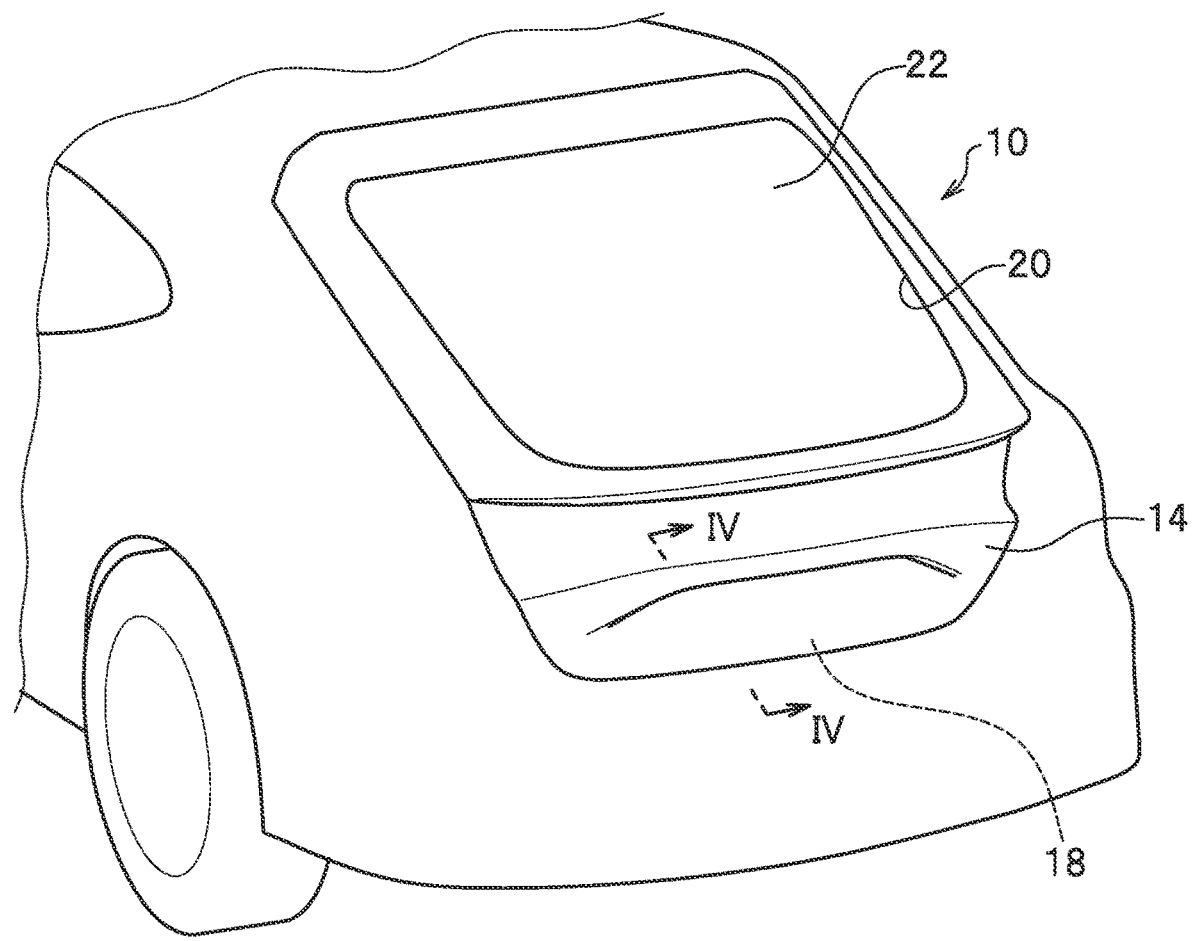
FIG. 1 is a perspective view partially showing a rear part of a vehicle including a tailgate, to which a vehicle door according to one embodiment of the present invention has been applied.
Figure 1:
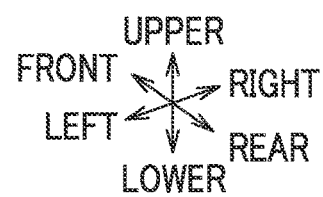

One embodiment of the present invention will be described in detail with reference to the accompanying drawings where appropriate. In the drawings, front and rear directions refer to corresponding directions in the longitudinal direction (i.e., front-rear direction) of a vehicle, right and left directions refer to corresponding directions in the vehicle width direction (i.e., lateral direction or right-left direction) of the vehicle, and upper and lower directions refer to corresponding directions in the vertical direction (i.e., upper-lower direction) of the vehicle.

As seen in FIG. 1, a tailgate (back door) 10, to which a vehicle door according to one embodiment of the present invention has been applied, is provided at a rear side of a vehicle body of a vehicle. The tailgate 10 is openably and closeably attached to a rear end portion of a roof panel provided at an upper portion of the vehicle body by a hinge (not shown).

The tailgate 10 includes an inner panel (interior-side panel) 12 disposed on a passenger compartment-side of the vehicle, an outer panel 14 (see FIG. 4) disposed on an exterior-side of the vehicle, and a middle panel (exterior-side panel) 16 disposed between the inner panel 12 and the outer panel 14. A door lock portion 18 (see FIG. 4) is provided at a rear end portion of the tailgate 10 of the vehicle (at a lower portion of the vehicle). The door lock portion 18 is locked to a lower portion of the vehicle body (e.g., rear bumper). Further, a door window 22 is provided in the tailgate 10 through a rectangular opening 20 (see FIG. 1).

Figure 3:
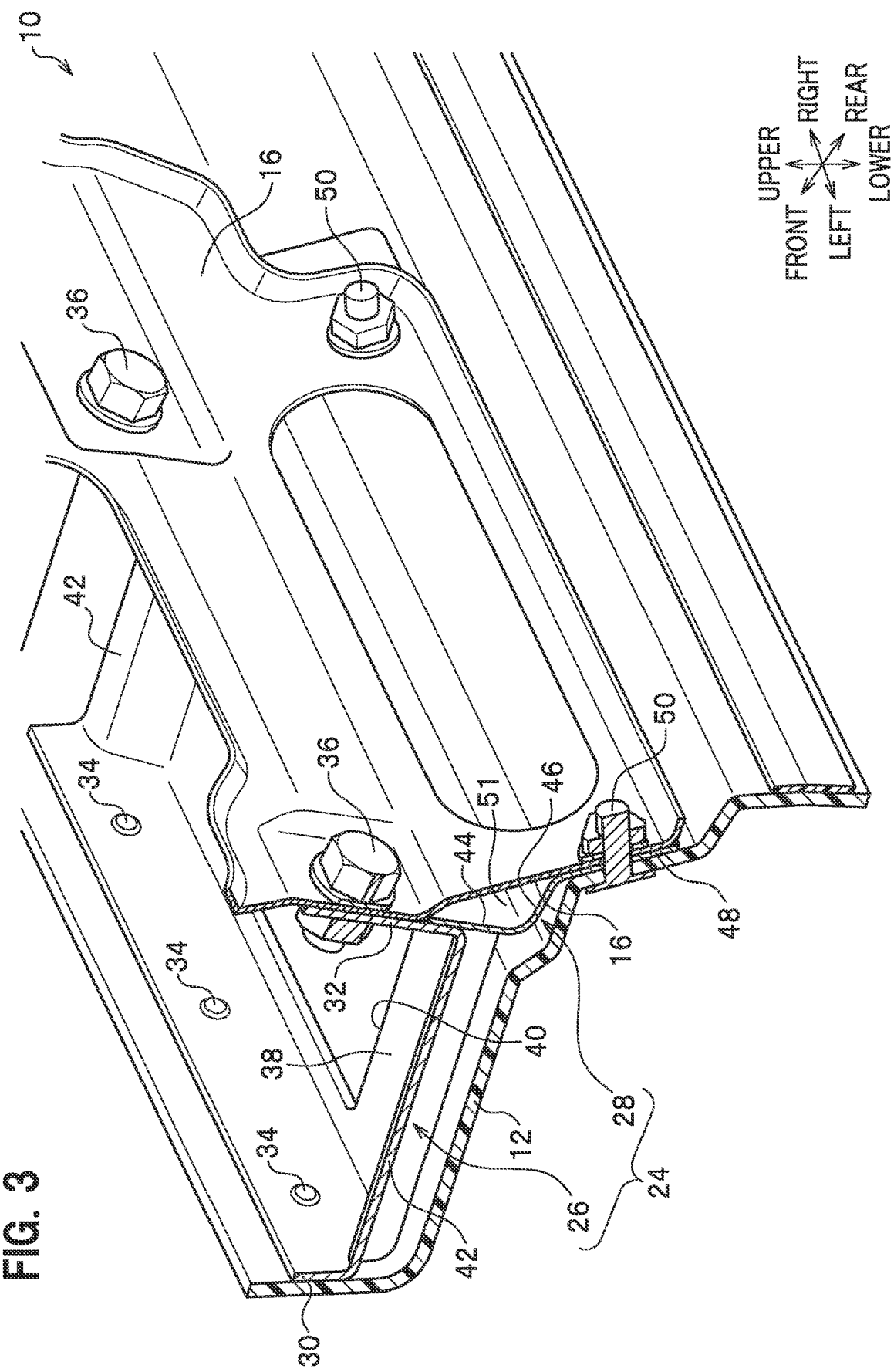
FIG. 3 is an enlarged perspective view partially showing the cross-section taken along the line of FIG. 2.
Figure 4:
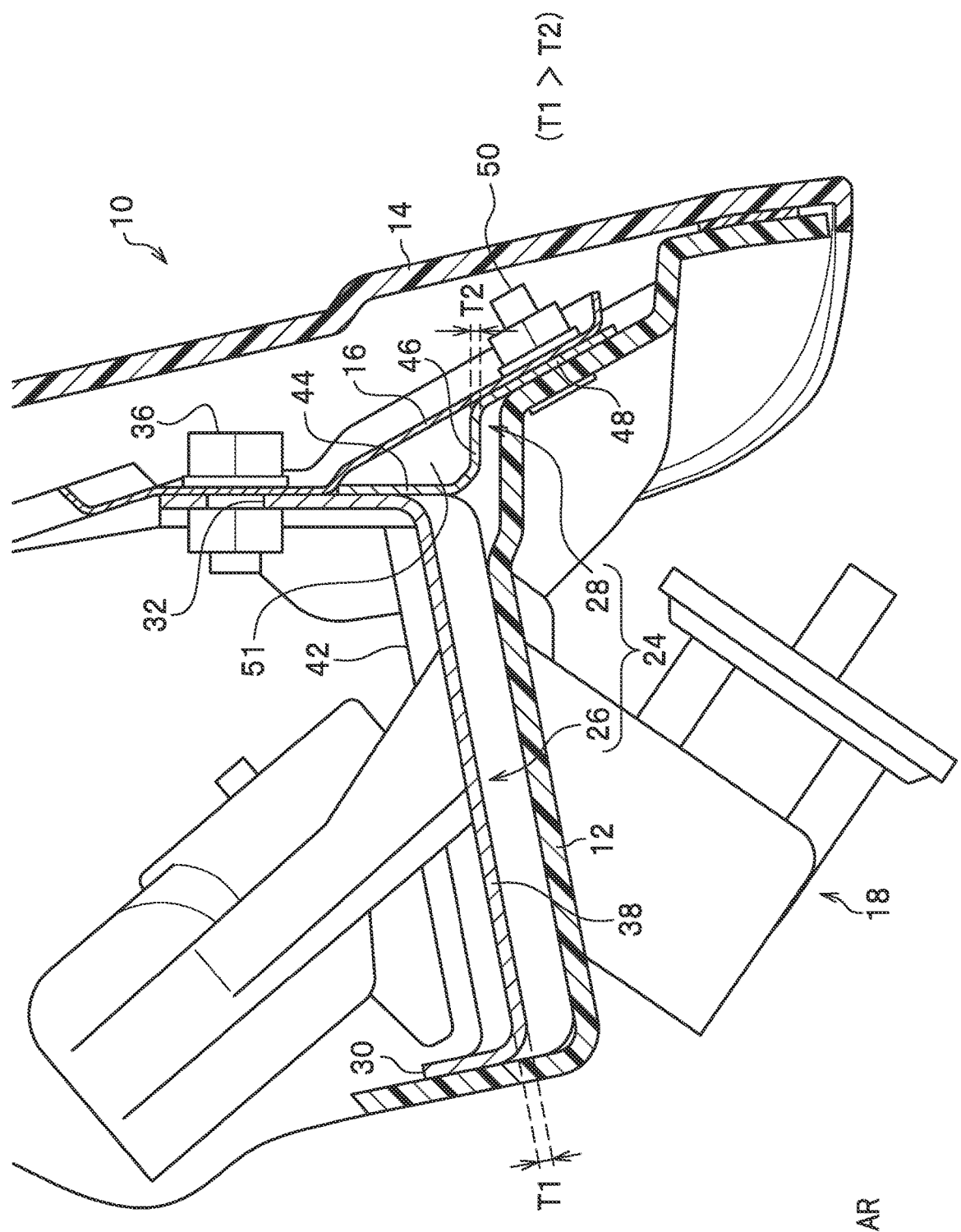
FIG. 4 is an enlarged sectional view taken along the line IV-IV of FIG. 1.
Figure 5:
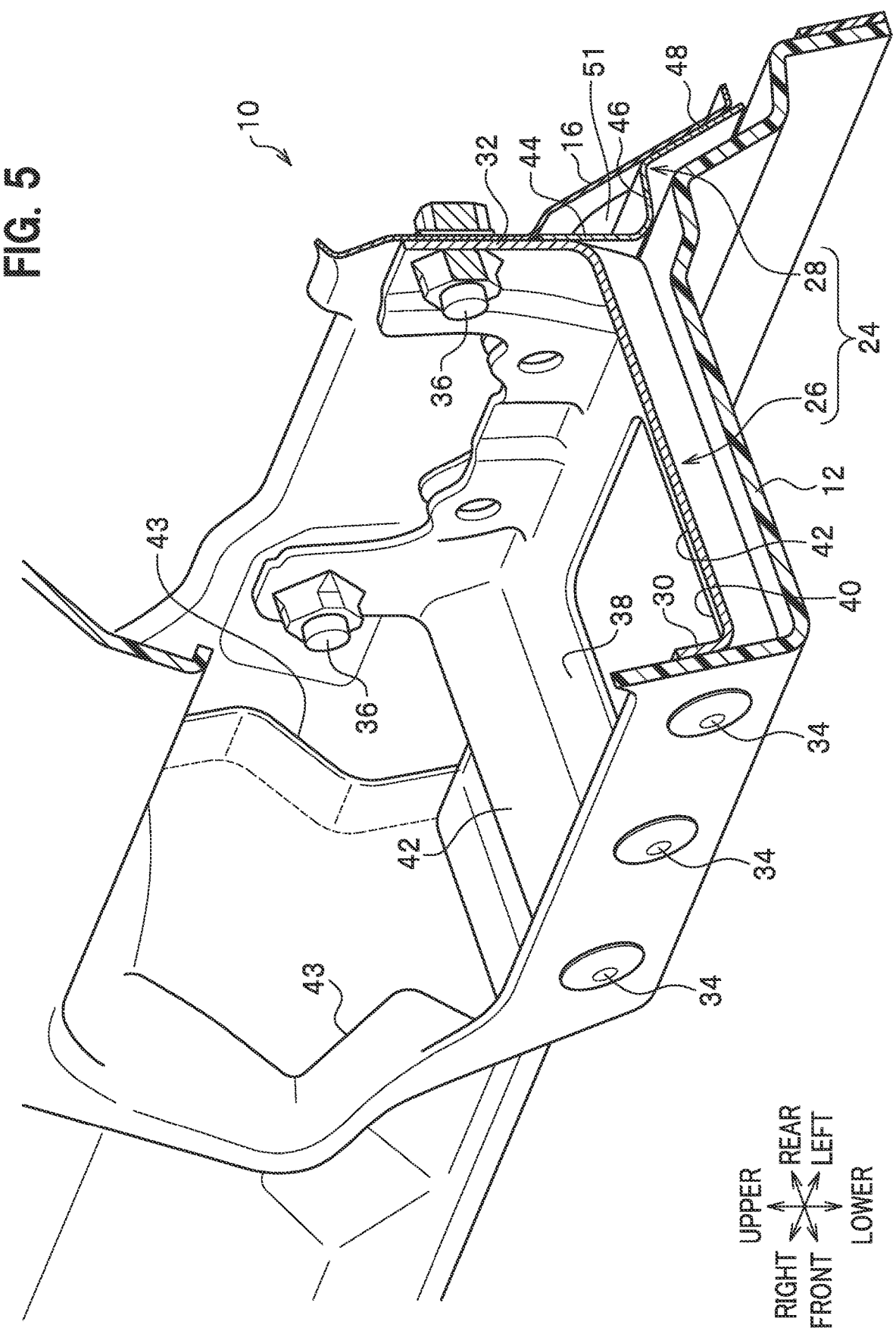
FIG. 5 is a partially sectional enlarged perspective view showing the state of FIG. 3 when viewing obliquely from a front side of the vehicle.

As seen in FIGS. 3 to 5, each of the inner panel 12 and the outer panel 14 is made of a plastic panel in this embodiment. The middle panel 16 is made of a metal panel. As used herein, the term "metal panel" includes a steel panel, an iron-based panel, an aluminum alloy panel, an aluminum-based panel, and the like.

Figure 2:
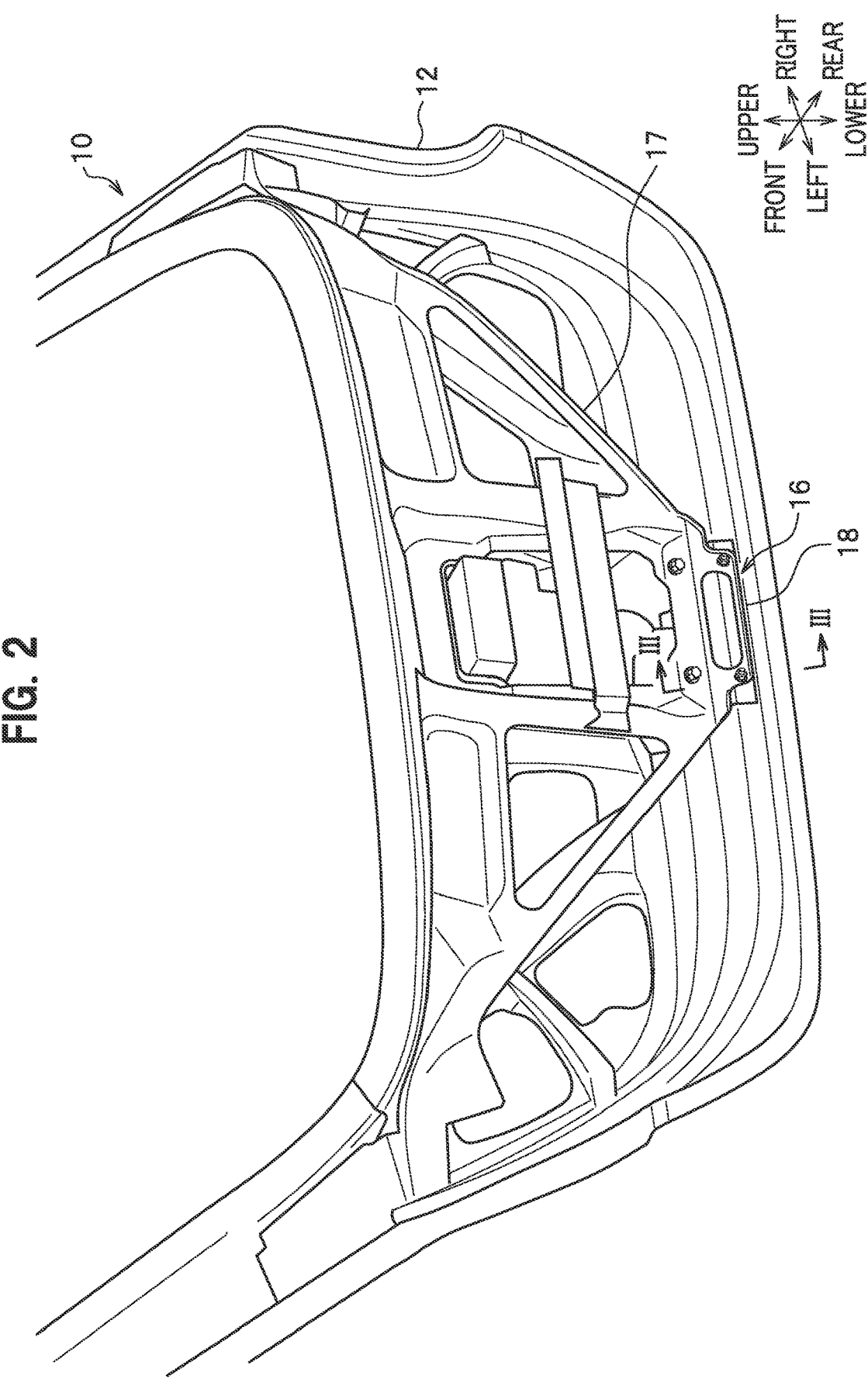
FIG. 2 is an enlarged perspective view showing the tailgate of FIG. 1 with an outer panel removed from the tailgate.

As seen in FIG. 2, the middle panel 16 has a frame body 17 in the shape of an inverted triangle when viewing from the rear side of the vehicle. An upper end of the frame body 17 is connected to a proximity of lower corner portions of a window frame. A lower end of the frame body 17 is connected to a lower center portion of the inner panel 12.

As seen in FIGS. 3 to 5, a bracket structure 24 is disposed between the inner panel 12 and the middle panel 16. The bracket structure 24 includes a first bracket 26 and a second bracket 28. The first bracket 26 and the second bracket 28 are formed separately as discrete members and disposed adjacent to each other in the longitudinal direction (front-rear direction) of the vehicle. As seen in FIG. 4, the maximum thickness dimension (T1) of the first bracket 26 is greater than the maximum thickness dimension (T2) of the second bracket 28 (T1>T2). Although the first bracket 26 and the second bracket 28 are formed separately as discrete members in this embodiment, the first bracket 26 and the second bracket 28 may be formed as a single piece member.

The first bracket 26 is disposed frontward of the second bracket 28. The first bracket 26 has a generally U-shaped cross-section in the longitudinal direction (front-rear direction) of the vehicle (see FIG. 4). Further, the first bracket 26 has a pair of extension portions each extending upward. The pair of extension portions are a front extension portion 30 extending in the vehicle width direction (lateral direction) and disposed on a front end of the bracket structure 24, and a rear extension portion 32 extending in the vehicle width direction (lateral direction) and disposed on a rear end of the bracket structure 24. In this embodiment, the height dimension of the rear extension portion 32 in the vertical direction (upper-lower direction) of the vehicle is greater than the height dimension of the front extension portion 30 (see FIG. 4). However, the front extension portion 30 and the rear extension portion 32 have the same or substantially the same height dimension.

As seen in FIG. 3, the front extension portion 30 is disposed on an interior-side of the bracket structure 24 and fastened (joined) to the inner panel 12 by bolts 34. The rear extension portion 32 is disposed on an exterior-side of the bracket structure 24 and fastened (joined) to the middle panel 16 by bolts 36. The bracket structure 24 includes a connecting portion 38 disposed between the front extension portion 30 and the rear extension portion 32. The connecting portion 38 connects the front extension portion 30 and the rear extension portion 32 in the longitudinal direction (front-rear direction) of the vehicle. The inner panel 12 is disposed under the connecting portion 38. The connecting portion 38 and the inner panel 12 are overlapped when viewing in the upper-lower direction of the vehicle. The connecting portion 38 has a flat-plate shape and substantially extends in the horizontal direction. When viewing from above, the connecting portion 38 has a generally rectangular opening 40. Further, a door lock portion 18 is attached to the connecting portion 38 (see FIG. 4).

Figure 7:
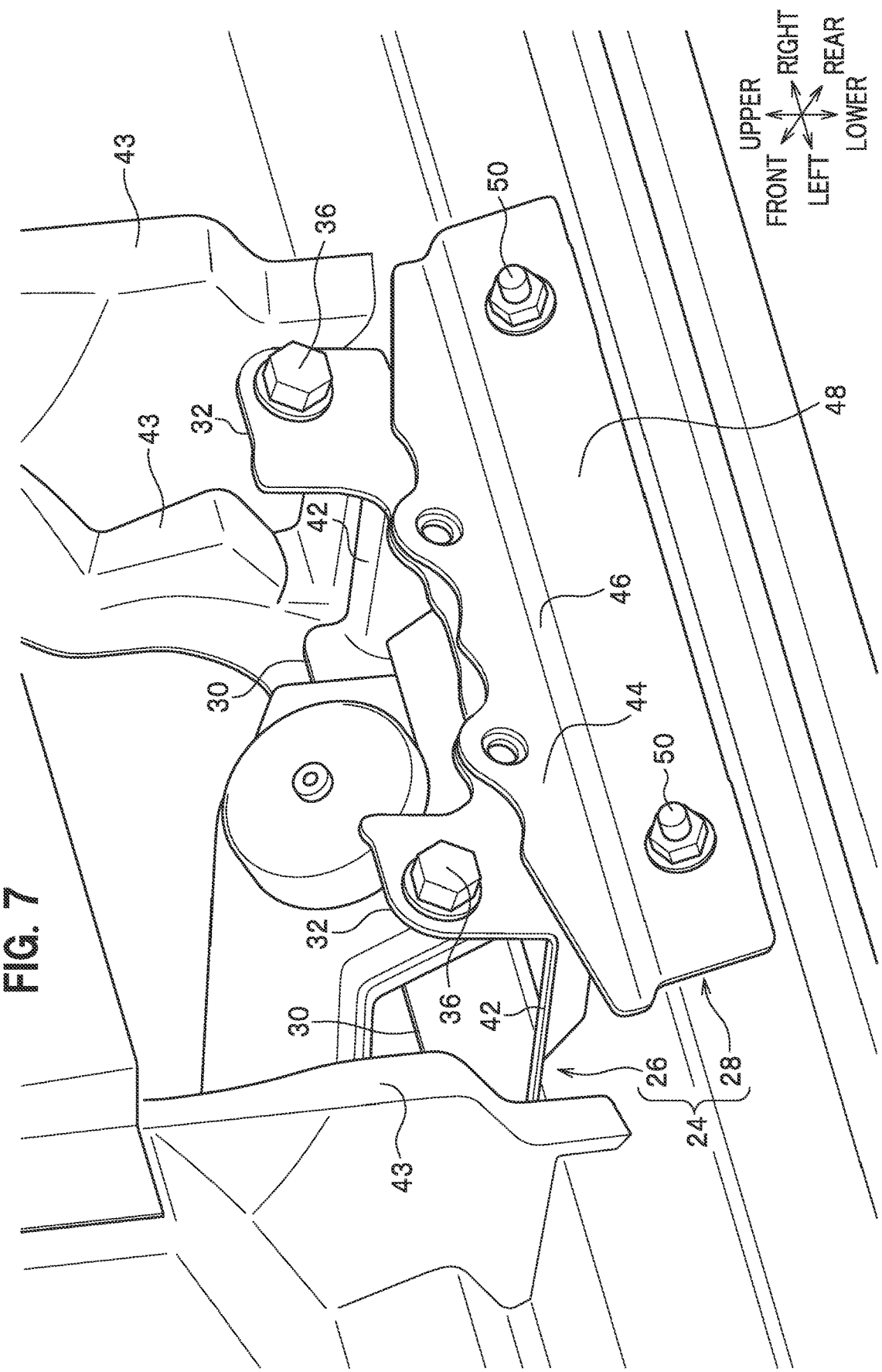
FIG. 7 is a partially enlarged perspective view of the first bracket and the second bracket when viewing from a rear side of the vehicle with the outer panel and a middle panel removed from the tailgate of FIG. 1.

Further, when viewing from above, the first bracket 26 has a pair of reinforcement ribs 42, 42 on both right and left sides (along the vehicle width direction) of the connecting portion 38. The reinforcement ribs 42, 42 extend in the longitudinal direction of the vehicle. Each of the reinforcement ribs 42, 42 is constituted by a one-side flange having an L-shaped cross-section protruding upward from the flat surface of the connecting portion 38. Further, the inner panel 12 is provided with a plurality of reinforcement ribs 43 extending in the vertical direction of the vehicle (see FIGS. 7 and 5). As seen in FIG. 7, the plurality of reinforcement ribs 43 are arranged side by side on the rear side of the inner panel 12 with the bracket structure 24 interposed therebetween.

Further, the first bracket 26 is surrounded at its front, rear, and lateral sides (at four directions), so that the rigidity and the strength of the door lock portion 18 that is provided on the lower portion of the tailgate 10 can be improved.

Figure 6A:
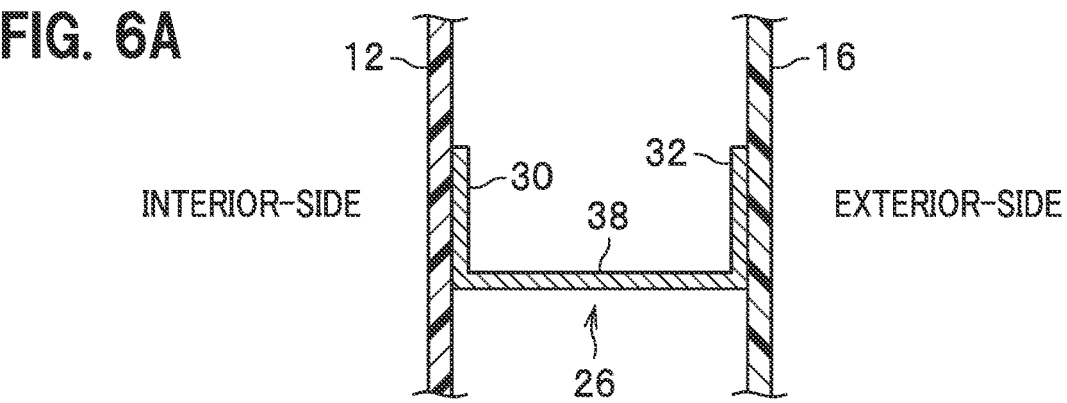
FIG. 6A is a schematic sectional view showing a first bracket according to this embodiment.

According to this embodiment, as seen in FIG. 6A, the first bracket 26 includes the front extension portion 30 and the rear extension portion 32 both extending upward. However, the present invention is not limited to this specific configuration.

Figure 6B:
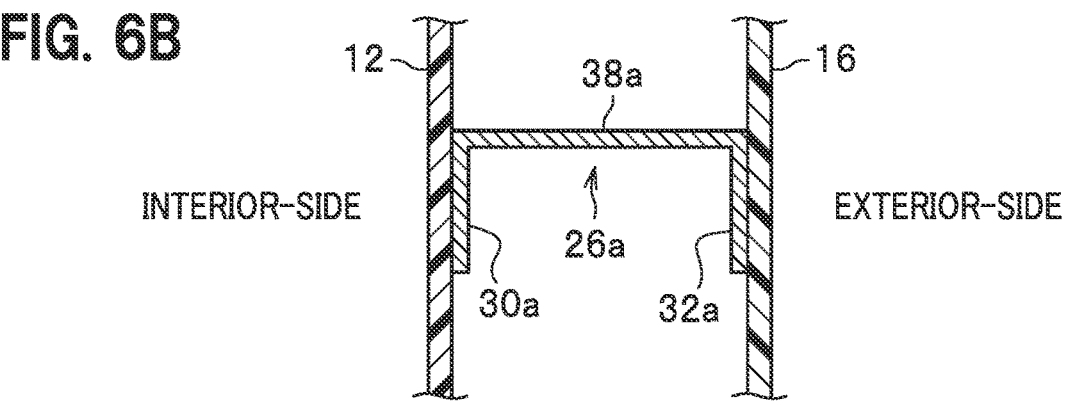
FIG. 6B is a schematic sectional view showing a first bracket according to a first modified embodiment.
Figure 6C:
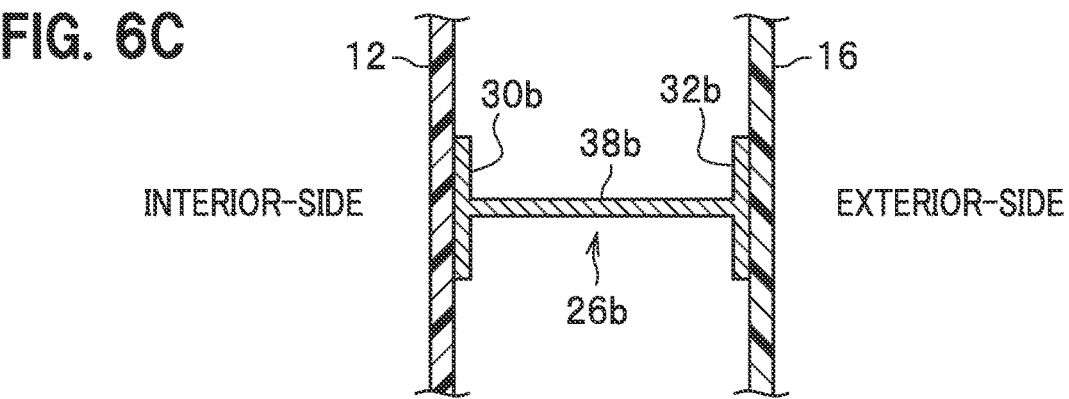
FIG. 6C is a schematic sectional view showing a first bracket according to a second modified embodiment.
Figure 6D:
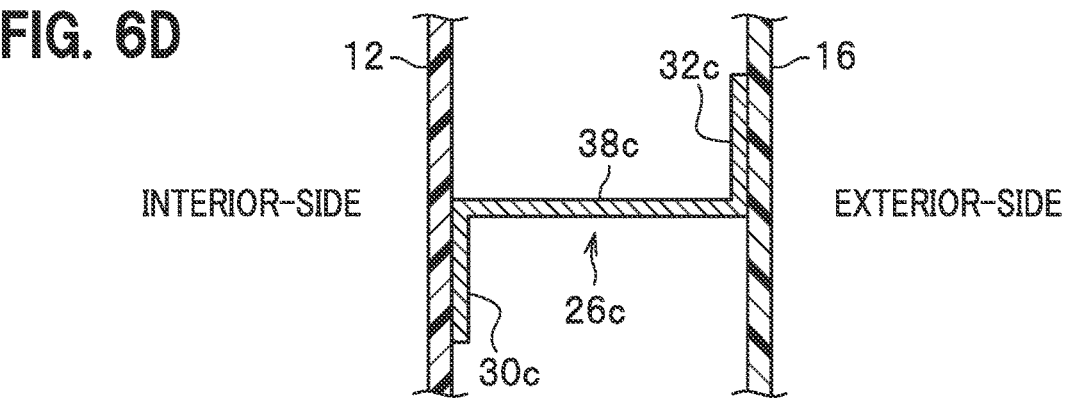
FIG. 6D is a schematic sectional view showing a first bracket according to a third modified embodiment.

For example, as seen in FIG. 6B, a first bracket 26a according to a first modified embodiment includes a front extension portion 30a and a rear extension portion 32a both extending downward. As seen in FIG. 6C, a first bracket 26b according to a second modified embodiment includes a front extension portion 30b and a rear extension portion 32b, both of which are connected at their middle portions in the upper-lower direction and supported by a connecting portion 38b, so that both of the front extension portion 30b and the rear extension portion 32b extend upward and downward in the upper-lower direction. Further, as seen in FIG. 6D, a first bracket 26c according to a third modified embodiment includes a front extension portion 30c located on the interior-side and extending downward, and a rear extension portion 32c located on the exterior-side and extending upward.

As seen in FIGS. 3 to 5, the second bracket 28 is disposed rearward of the first bracket 26 in the longitudinal direction (front-rear direction) of the vehicle. The second bracket 28 includes an upward extension portion 44, a generally flat portion 46, and a downward extension portion 48. The upward extension portion 44 extends in the vehicle width direction. The upward extension portion 44 is disposed on a front end of the second bracket 28 and extend upward. The generally flat portion 46 is bent at a rear end of the upward extension portion 44 and extends rearward in the longitudinal direction of the vehicle. The downward extension portion 48 extends continuously from a rear end of the generally flat portion 46 and extends downward. The downward extension portion 48, the middle panel 16, and the inner panel 12 are fastened (joined) together by bolts 50 (see FIGS. 3 and 4). Further, as seen in FIGS. 3 to 5, the middle panel 16, the upward extension portion 44, and the generally flat portion 46 constitute a closed hollow section 51 having a triangular cross-section.

With this configuration of the closed hollow section 51, the second bracket 28 is less likely to vibrate. For example, an impact load generated when the tailgate 10 is slammed shut can be transmit not only to the front extension portion 30 and the rear extension portion 32 of the first bracket 26 but also to the downward extension portion 48 of the second bracket 28, so that deformation of the lower end portion of the tailgate 10 can be suppressed. Further, providing the downward extension portion 48 makes it possible to reinforce against the deformation at the lower end portion of the tailgate 10, so that the capacity of a so-called parting space (space for deformation) between the lower end portion of the tailgate 10 and the rear bumper (not shown) can be reduced. As a result, the exterior design (external appearance quality) of the rear part of the vehicle can be improved in this embodiment.

As seen in FIGS. 4 and 5, the rear extension portion 32 of the first bracket 26 and the upward extension portion 44 of the second bracket 28 are connected (joined) together by connecting means (not shown).

The door lock portion 18 is configured to lock the tailgate 10 to the vehicle body while the tailgate 10 is closed. The door lock portion 18 is locked when it is engaged with a lock receiving portion (not shown) provided on the vehicle body.

The tailgate 10 to which the vehicle door according to this embodiment has been applied is basically configured as described above. Next, the operational effects of the tailgate 10 will be described.

According to this embodiment, the tailgate 10 includes the first bracket 26 (bracket structure 24) disposed between the inner panel 12 (interior-side panel) and the middle panel 16 (exterior-side panel). The first bracket 26 has extension portions extending in the upper-lower direction respectively on the interior-side and the exterior-side of the first bracket 26. These extension portions include the front extension portion 30 (interior-side extension portion) disposed on the interior-side and fastened (joined) to the inner panel 12, and the rear extension portion 32 (exterior-side extension portion) disposed on the exterior-side and fastened (joined) to the middle panel 16.

According to this embodiment, both end portions of the first bracket 26 located along the longitudinal direction (front-rear direction) of the vehicle are fixed to the inner panel 12 and the middle panel 16 through the front extension portion 30 and the rear extension portion 32. With this configuration, the surface on which the door lock portion 18 to be locked to the vehicle body is positioned becomes robust against vibration, and vibration transmitted from the door lock portion 18 to the first bracket 26 is suppressed. Further, it is possible to suppress vibration generated when the tailgate 10 is closed and thus to take measures against NV (noise and vibration).

According to this embodiment, it is possible to provide the tailgate 10 capable of suppressing vibration and unusual noise generated when the vehicle door is closed.

Further, according to this embodiment, a collision load in a rear-end collision can be transmitted from the rear extension portion 32 to the front lower end of the inner panel 12 through the front extension portion 30, so that the first bracket 26 and the middle panel 16 can be prevented from leaning forward in the longitudinal direction of the vehicle. As a result, the rear extension portion 32 of the first bracket 26 and the middle panel 16 are less likely to be separated in this embodiment, and the outer panel 14 is less likely to be dented. This can prevent the outer handle (not shown) from being damaged.

In this embodiment, each of the inner panel 12 and the outer panel 14 is made of a plastic panel, and the middle panel 16 is made of a metal panel.

According to this embodiment, since the interior-side panel and the exterior-side panel are configured such that the middle panel 16 that is positioned closer to the exterior-side of the vehicle than the inner panel 12 is made of a metal plate, the rear extension portion 32 of the first bracket 26 can be fastened and fixed to the middle panel 16 made of metal. As a result, according to this embodiment, the rear extension portion 32 fastened and fixed to the middle panel 16 made of metal has an enhanced rigidity and strength, so that vibration transmitted from the door lock portion 18 to the first bracket 26 can be suppressed. Further, according to this embodiment, since the inner panel 12 and the outer panel 14 are made of plastic (each of the inner panel 12 and the outer panel 14 are made of a plastic panel), vibration transmitted from the door lock portion 18 to the first bracket 26 can be suppressed while reducing the weight of the vehicle.

According to this embodiment, the second bracket 28 (bracket structure 24) has the downward extension portion 48 extending downward. The downward extension portion 48, the middle panel 16, and the inner panel 12 are integrally fastened (joined) together by the bolts 50.

Since the downward extension portion 48 of the second bracket 28 is fastened to the middle panel 16 and the inner panel 12, the rigidity and the strength of the downward extension portion 48 can be improved. Therefore, for example, an impact load generated when the tailgate 10 is slammed shut can be transmit not only to the front extension portion 30 and the rear extension portion 32 of the first bracket 26 but also to the downward extension portion 48 of the second bracket 28, so that deformation of the lower end portion of the tailgate 10 can be suppressed. Further, providing the downward extension portion 48 makes it possible to reinforce against the deformation at the lower end portion of the tailgate 10, so that the capacity of a so-called parting space (space for deformation) between the lower end portion of the tailgate 10 and the rear bumper (not shown) can be reduced. As a result, the exterior design (external appearance quality) of the rear part of the vehicle can be improved in this embodiment.

According to this embodiment, the first bracket 26 (bracket structure 24) has the connecting portion 38 for connecting the front extension portion 30 and the rear extension portion 32 in the longitudinal direction (front-rear direction) of the vehicle, and the inner panel 12 is disposed under the connecting portion 38. Further, the connecting portion 38 is joined to the inner panel 12 through the front extension portion 30 and the bolts 34 (see FIGS. 3 and 4). Furthermore, the connecting portion 38 is joined to the inner panel 12 through the rear extension portion 32, the second bracket 28, and the bolts 50 (see FIGS. 3 and 4).

According to this embodiment, since the connecting portion 38 for connecting the front extension portion 30 and the rear extension portion 32 of the first bracket 26 in the longitudinal direction (front-rear direction) of the vehicle is joined to the inner panel 12 by the bolts 34 and the bolts 50, the rigidity and the strength of the rear extension portion 32, the front extension portion 30, and the connecting portion 38, to which a rear-end collision load is transmitted, can be improved. As a result, according to this embodiment, the door lock portion 18 is less likely to be disengaged from the lock receiving portion (not shown) of the vehicle body by enhancing the rigidity and the strength of the first bracket 26 and vibration at the door lock portion 18 can be suppressed.

According to this embodiment, the bracket structure 24 includes the first bracket 26 having the front extension portion 30 and the rear extension portion 32, and the second bracket 28 having the downward extension portion 48. The first bracket 26 and the second bracket 28 are formed separately as discrete members.

With this configuration, according to this embodiment, it is possible to appropriately select the thickness and/or the material (different kinds of materials) of the first bracket 26 and the second bracket 28 constituting the bracket structure 24. This can improve the degree of freedom in designing the bracket structure 24.

According to this embodiment, the maximum thickness dimension (T1) of the first bracket 26 is greater than the maximum thickness dimension (T2) of the second bracket 28 (T1>T2).

According to this embodiment, since the first bracket 26 is thicker than the second bracket 28, the first bracket 26 can absorb a rear-end collision load in an appropriate manner. Further, making the second bracket 28 thinner than the first bracket 26 results in reduced weight of the vehicle body.

According to this embodiment, each of the inner panel 12 and the outer panel 14 is made of a plastic panel, and the middle panel 16 is made of a metal panel.

According to this embodiment, since the inner panel 12 and the outer panel 14 are made of plastic, it is possible to facilitate plastic molding and to improve the exterior design of the vehicle. Further, since the first bracket 26 is fastened and fixed to the middle panel 16 that is made of metal, the rigidity and the strength of the first bracket 26 can be improved.

Although one embodiment of the present invention and some modifications thereof have been described above, the present invention is not limited to the above-described embodiment and various changes and modifications may be made where appropriate without departing from the gist of the present invention. For example, the tailgate 10 includes the middle panel 16 in the above-described embodiment. However, the tailgate 10 may not include the middle panel 16. In this example, the outer panel 14 serves as the exterior-side panel.

What is claimed is:

1. A vehicle door openably and closeably attached to a rear portion of a vehicle body, the vehicle door comprising:
    an inner panel;
    an outer panel;
    a middle panel disposed between the inner panel and the outer panel;
    a door lock portion to be locked to the rear portion of the vehicle body; and
    a bracket structure disposed between the inner panel and the middle panel and configured to support the door lock portion,
    wherein the bracket structure has extension portions respectively disposed in a front-rear direction of a vehicle and extending upward, and
    wherein the extension portions are a front extension portion disposed frontward and joined to the inner panel, and a rear extension portion disposed rearward and joined to the middle panel.

2. The vehicle door according to claim 1, wherein the bracket structure has a downward extension portion extending downward, and
    wherein the downward extension portion, the middle panel, and the inner panel are integrally joined together.

3. The vehicle door according to claim 1, wherein the bracket structure has a connecting portion for connecting the front extension portion and the rear extension portion in the front-rear direction of the vehicle,
    wherein the inner panel is disposed under the connecting portion, and
    wherein the connecting portion is joined to the inner panel through the front extension portion.

4. The vehicle door according to claim 2, wherein the bracket structure includes a first bracket having the front extension portion and the rear extension portion, and a second bracket having the downward extension portion, and
    wherein the first bracket and the second bracket are formed separately as discrete members.

5. The vehicle door according to claim 4, wherein a maximum thickness dimension of the first bracket is greater than a maximum thickness dimension of the second bracket.

6. The vehicle door according to claim 1, wherein each of the inner panel and the outer panel is made of a plastic panel, and the middle panel is made of a metal panel.

* * * * *